United States Patent [19]
Elton

[11] Patent Number: 5,280,995
[45] Date of Patent: Jan. 25, 1994

[54] VEHICLE SEAT ASSEMBLY WITH ROTATING SEAT PACK PANEL AND INTEGRAL CHILD SEAT

[75] Inventor: Robert D. Elton, Ann Arbor, Mich.

[73] Assignee: Hoover Universal, Inc., Plymouth, Mich.

[21] Appl. No.: 976,451

[22] Filed: Nov. 13, 1992

[51] Int. Cl.⁵ .............................................. A47L 15/00
[52] U.S. Cl. ................................... 297/238; 297/484; 280/807; 280/808
[58] Field of Search ................ 297/234, 484; 280/801, 280/807, 808; 296/64, 65.1, 69

[56] References Cited

U.S. PATENT DOCUMENTS

| | | | |
|---|---|---|---|
| 2,966,201 | 12/1960 | Strahler | 297/238 |
| 3,994,513 | 11/1976 | Courtis | 280/808 |
| 4,218,074 | 8/1980 | Crawford | 280/801 R |
| 4,681,367 | 7/1987 | Timmers | 297/238 X |
| 4,690,455 | 9/1987 | Bailey et al. | 297/238 |
| 4,756,573 | 7/1988 | Simin et al. | 297/238 X |
| 4,770,459 | 9/1988 | Nakaiwa et al. | 280/801 R |
| 5,044,683 | 9/1991 | Parsson | 280/808 X |
| 5,135,285 | 8/1992 | Dukatz et al. | 297/484 |
| 5,161,855 | 11/1992 | Harmon | 297/238 |
| 5,224,756 | 7/1993 | Dukatz et al. | 297/238 |

FOREIGN PATENT DOCUMENTS 2023415 1/1980 United Kingdom .............. 297/238

Primary Examiner—Michael F. Trettel
Attorney, Agent, or Firm—Harness, Dickey & Pierce

[57] ABSTRACT

A vehicle seat assembly with a rotating seat back panel having an integral child seat. An interlock is provided between the child seat latches and the latches for the rotating seat back panel to prevent deployment of the child seat when the seat back panel is unlatched and also to prevent unlatching of the seat back panel when the child seat is deployed. This ensures that the child seat can not be used unless the seat back panel is properly latched providing the load path for the child seat shoulder belts from the child seat to the vehicle structure.

23 Claims, 4 Drawing Sheets

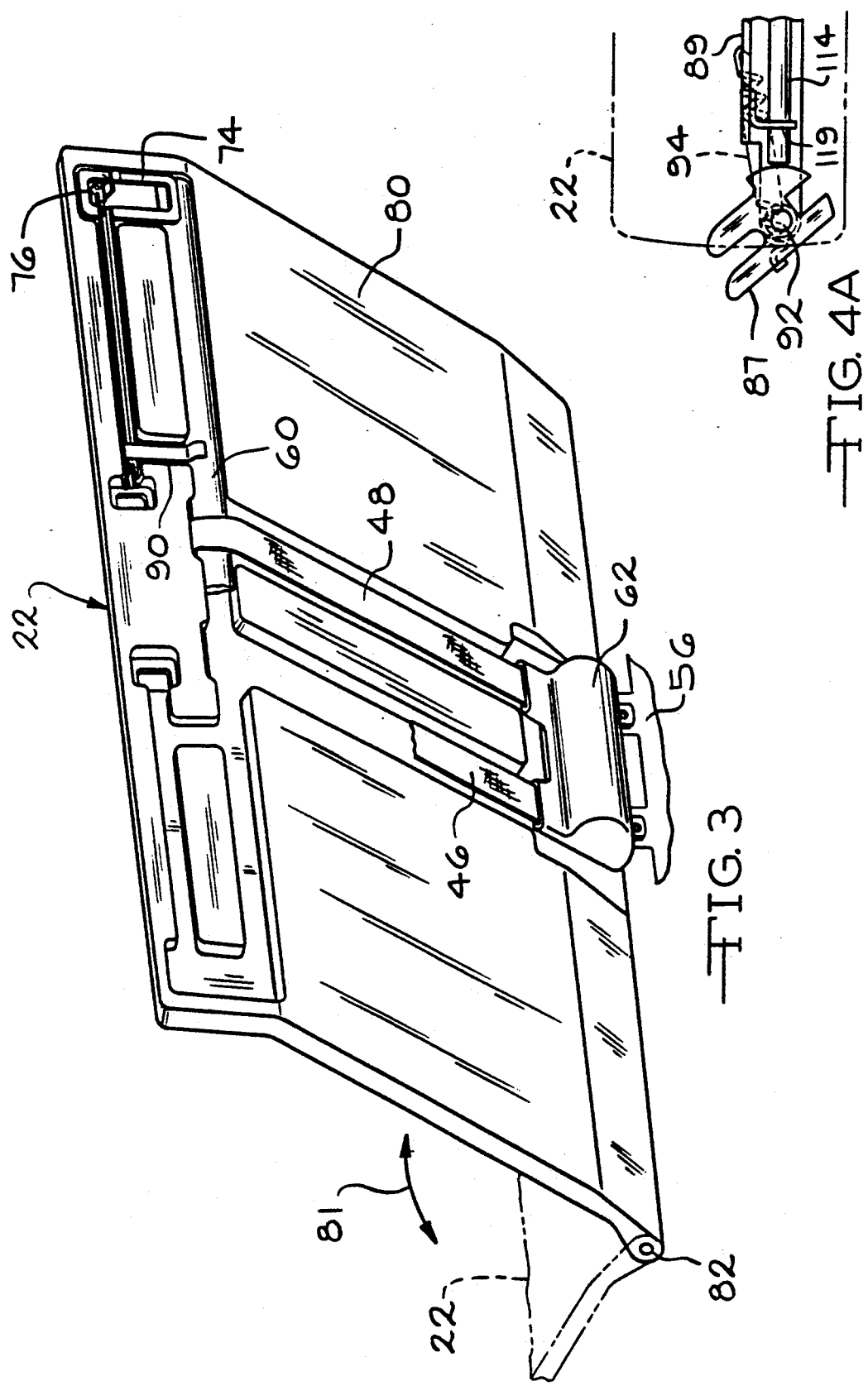

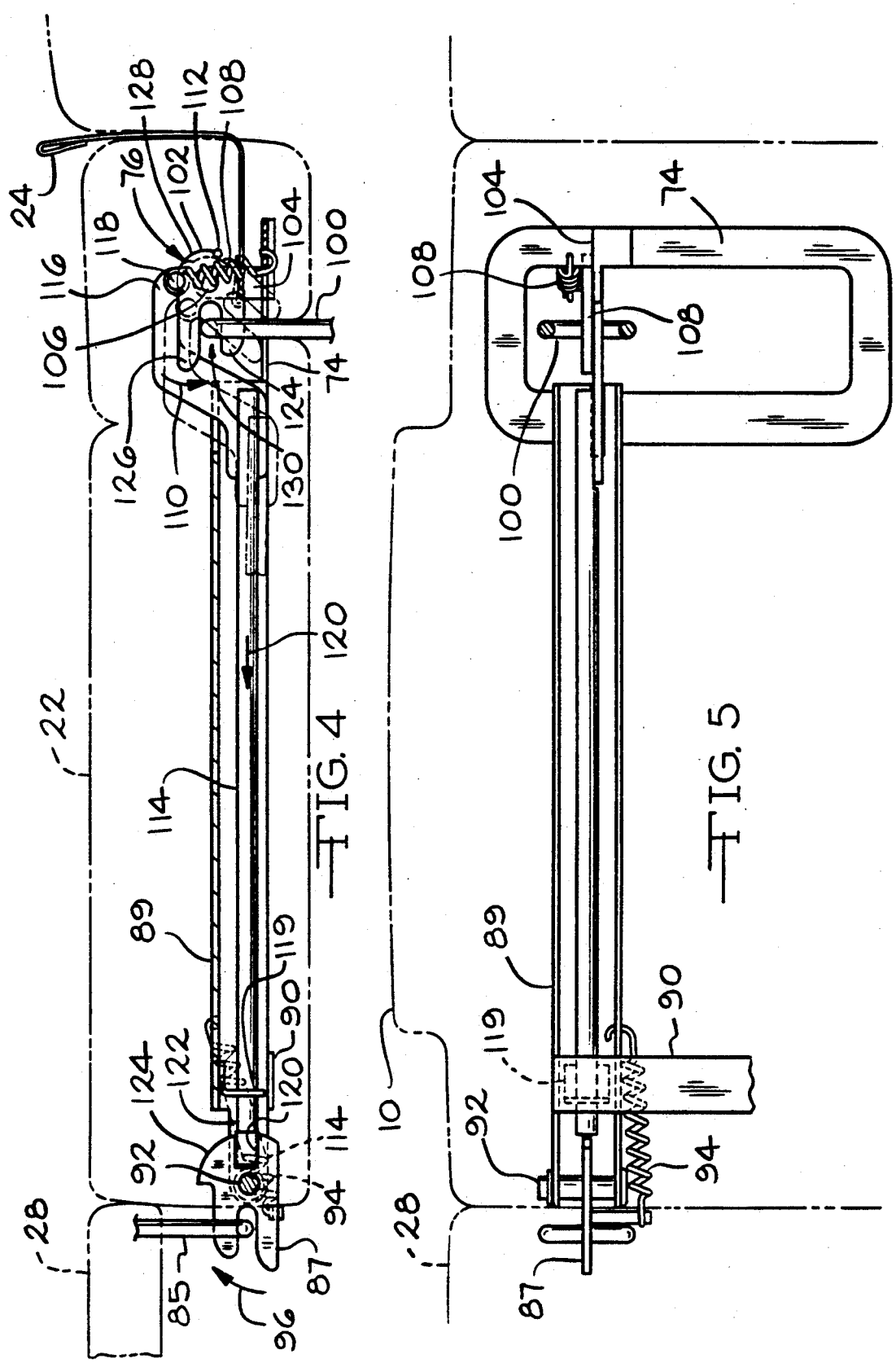

VEHICLE SEAT ASSEMBLY WITH ROTATING SEAT PACK PANEL AND INTEGRAL CHILD SEAT

BACKGROUND AND SUMMARY OF THE INVENTION

The present invention relates to a vehicle seat assembly with an integral child seat assembly and in particular to such a seat assembly in which the seat back includes a folding seat back panel to gain access to the space behind the seat back.

With typical vehicle seat assemblies, the seat belt systems, while closely associated with the seat assemblies, are anchored directly to the vehicle structure. As a result, the seat assembly does not carry the restraint loads applied by the seat belts. Instead, these loads are applied directly from the belts to the vehicle structure. However, when a seat assembly is equipped with an integral child seat assembly, some of the restraint loads from the child seat assembly are typically transferred to the seat back of the seat assembly and from there to the vehicle structure. In the rear bench seat of a passenger car vehicle, the child seat assembly belt loads may be transferred to both the vehicle floor pan as well as to the vehicle body structure behind the seat back or at the side the seat back.

The seat back of the present invention has a rotating seat back panel that is pivotally mounted at its lower end for rotation. In an upright use position, the panel forms a portion of the seat back. It is rotatable from the upright use position to a generally horizontal, forwardly extending stowed position resting upon the seat cushion. When the panel is in the stowed position, the area of the seat assembly is open to the space behind the seat back for increased storage capacity. With the adult seat belts attached directly to the vehicle structure and not to the seat back frame, the rotating seat back panel has no affect on the adult seat belts.

However, when the rotatable seat back panel is equipped with an integral child seat assembly, it is necessary to provide a load path from the child seat assembly shoulder belts to the vehicle structure that allows for the seat back panel to be rotated forward. If the child seat assembly shoulder belts are attached permanently to the vehicle body structure at the upper end of the seat back, the belts would present an obstacle to full utilization of the increased cargo space when the seat back panel is rotated forward. To avoid this obstacle, the child seat assembly shoulder belts are attached to the rotating seat back panel. The panel is in turn latched to the vehicle body structure. It is thus necessary that the panel be latched to the vehicle structure before the child seat assembly is used.

Accordingly, it is an object of the present invention to provide a rotating seat back panel, having an integral child seat assembly, with an interlock to prevent deployment and use of the child seat assembly without the seat back panel being properly latched. Likewise, it is also an object of the invention to prevent the seat back panel from being unlatched while the child seat assembly is deployed.

It is a feature of the seat back of the present invention that the child seat shoulder belt loads are transferred to the vehicle structure through the latch mechanism used to latch the seat back panel in its upright use position. An interlock is provided between the latch mechanism for the seat back panel and the latch mechanism for deploying the child seat assembly. The interlock prevents the child seat assembly from being deployed and used if the seat back panel is not properly latched and also prevents unlatching of the seat back panel if the child seat assembly is deployed.

Many seat back panels are constructed of a blow molded plastic body covered with a foam pad and upholstery cover. Such a structure is sufficient for carrying the normal use load of the seat back. However, when a child seat assembly is integrated into the seat back with additional belts for the child seat, it is necessary to provide a load path for the child seat shoulder belts to the vehicle structure. The seat back of the present invention provides a load path in which the child seat belt loads are carried through metal load bearing components exclusively, to avoid reliance upon the plastic seat back panel to support the seat belt loads.

Further objects, features and advantages of the invention will become apparent from a consideration of the following description and the appended claims when taken in connection with the accompanying drawings.

BRIEF DESCRIPTION OF THE DRAWINGS

FIG. 3 is a rear perspective view of the blow molded rotating plastic panel of the seat back;

FIG. 4 is a top plan view of the interlock between the child seat assembly latch and the seat back panel latch;

FIG. 4A is a fragmentary view of the child seat cushion latch of FIG. 4 illustrated in an unlatched position; and FIG. 5 is a rear elevational view of the latches and interlock shown in FIG. 4.

DETAILED DESCRIPTION OF THE INVENTION

Figure 1:
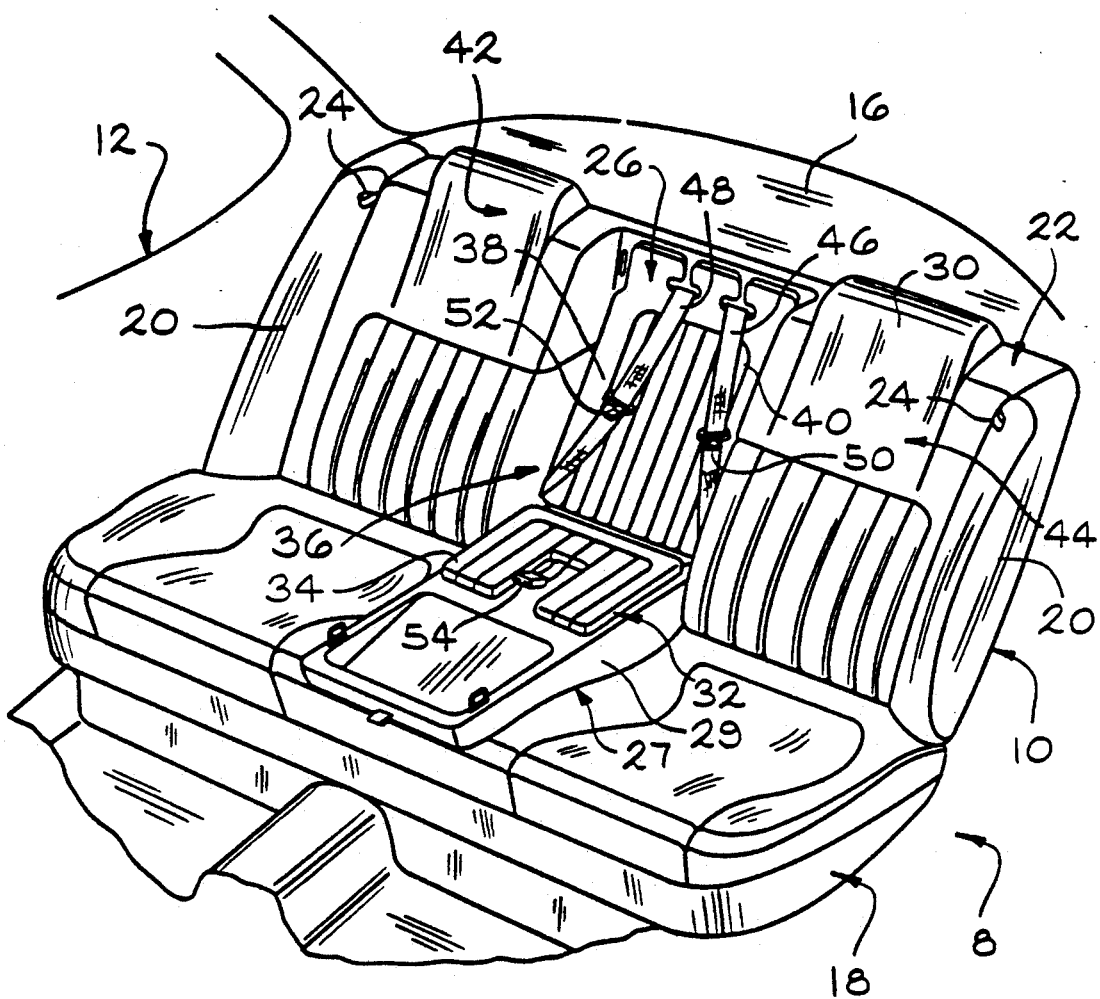
FIG. 1 is a perspective view of the seat assembly of the present invention with an integral child seat assembly with the child seat assembly deployed.

The seat assembly of the present invention, having a rotating seat back panel with an integral child seat, is shown in FIG. 1 and designated generally at 8. Seat assembly 8 is installed within a motor vehicle 12 having a floor pan 14 and a rear shelf 16. The seat assembly 8 includes a lower seat cushion 18 and a seat back 10 extending generally upwardly at the rear of the seat cushion. As shown and described, the seat assembly 8 is a rear bench seat in a passenger car with a rear shelf structure. However, as will become apparent, the invention is not limited to seat assemblies within vehicles having a shelf structure. The seat back 10 includes a pair of side bolsters 20 at the lateral sides of the seat back and a seat back panel 22. As described in greater detail below, the panel 22 is rotatably mounted to the vehicle for rotation from the upright use position shown in FIG. 1 to a forwardly extending stowed position resting upon the seat cushion 18, (see FIG. 3). When the panel is in the stowed position, access is permitted to the space behind the seat back panel. A pair of seat back panel latches 76 are provided for coupling the seat back panel to the vehicle shelf 16 to hold the seat back panel 22 in the upright position. The latches are released by fabric pull tabs 24 at each side of the seat back.

The seat back panel includes an integral child seat assembly 26 for use by a child occupant. The child seat assembly includes a seat cushion 27 rotatably mounted at its lower end to the seat back panel 22. The seat cushion 27 has an upright stowed position in which it forms a portion of the face surface 30 of the seat back and is rotatable to a forwardly extending use position shown in FIG. 1 for use as a child seat cushion. When in the use position, the child seat cushion forms a seating surface 32 upon which a child can be seated. The child seat cushion 27 is formed by a seat pan 28 (FIG. 2) with a foam pad 29 on the front side for use as an adult seat back and is covered with a seat cover. A removable pad 34 is placed on the rear side of the seat pan 28 to form the child seating surface 32.

When the seat cushion 27 is rotated down, a recess 36 is formed in the face surface 30 of the seat back. The recess has a seat back surface 38 for a child with an upholstered pad 40. The adult seat back cushions 42 and 44 on either side of the recess 36 form side bolsters for the child seat assembly.

With the child seat cushion 27 rotated forward to the deployed use position, a restraint system for the child seat assembly is revealed. The restraint system includes a left shoulder belt 46 and a right shoulder belt 48. Sliding clasps 50 and 52 are provided on the belts 46 and 48 respectively. A buckle 54 is provided on the top of the seat cushion 27 for reception of the two clasps 50 and 52.

Figure 2:
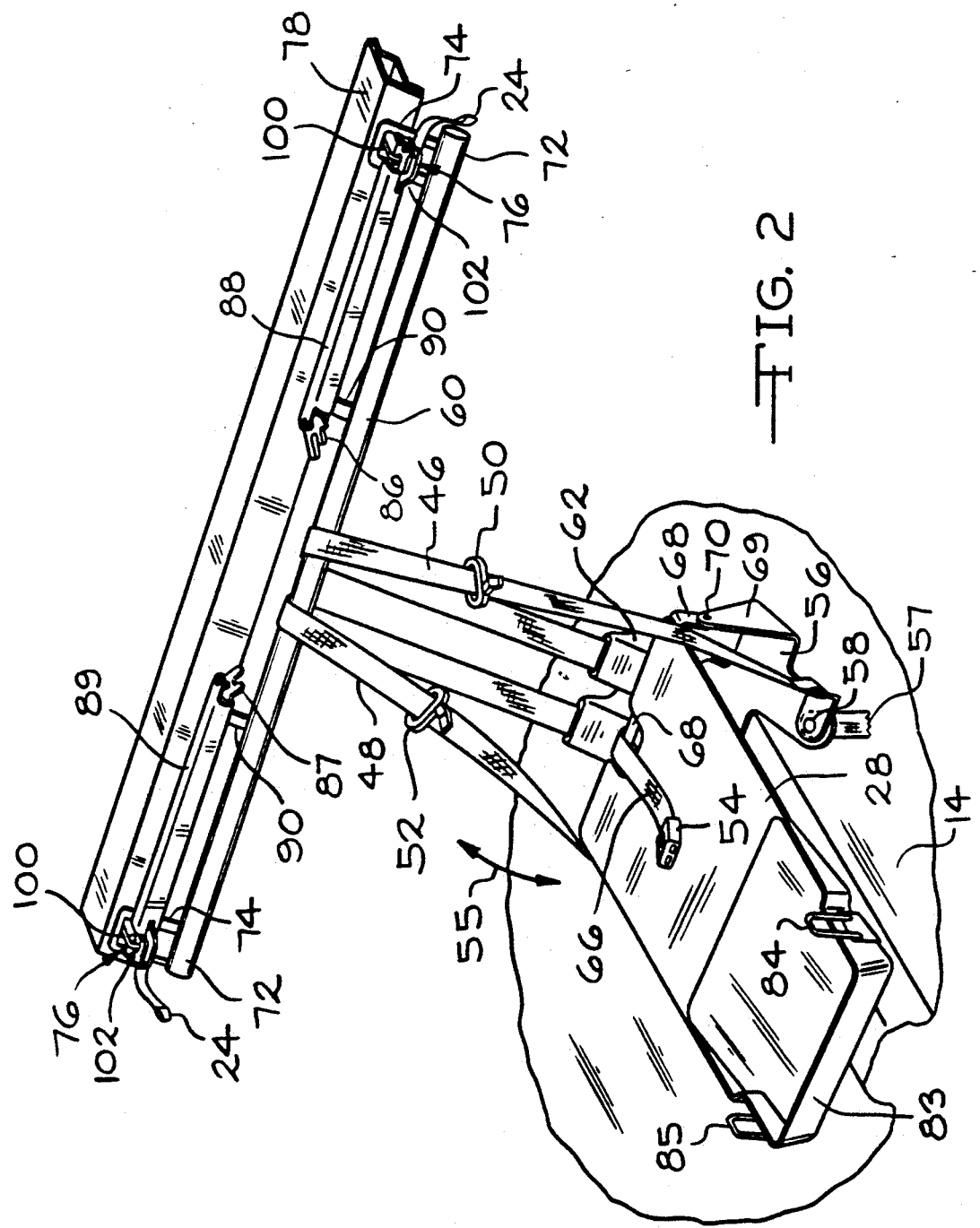
FIG. 2 is a perspective view illustrating the structural components of the child seat assembly including the child seat restraint system and its attachment to the vehicle structure.

With reference to FIG. 2, the structure of the child seat assembly and the restraint system is shown in greater detail. A single bracket 56 is attached to the vehicle floor pan 14 and is used to mount both the rotating child seat cushion 27 and the belts 46 and 48 of the restraint system as well as some of the adult set belts 57. The use of a single bracket 56 to mount the adult seat belts, the child seat belts and the child seat cushion eliminates the need for any structural changes in the vehicle floor pan to accommodate a child seat assembly integral in the seat back. One end of each of the belts 46 and 48 is attached to the floor pan through seat belt anchor bolts 58 which are also used to anchor some of the adult seat belts 57 for the seat assembly 8. From the anchors 58, the belts 46 and 48 extend upwardly over support bar 60 that extends laterally across the seat back panel 22. Additional details of the support bar will be described below.

The sliding clasps 50 and 52 are carried by the portion of the belts extending from the anchors 58 up to the support bar 60. After passing over the support bar 60, the belts extend downward to a dual retractor assembly 62 attached to bracket 56. The seat belt buckle 54 is attached to a strap 66 which is in turn mounted to a bar 68 at the base of the seat pan 28. The seat pan 28 is attached to mounting bosses 69 of the bracket 56 for rotation about the pivot 70 to raise and lower the child seat cushion. The shoulder belts 46 and 48, when the clasps are inserted into the buckle 54 around a child seat occupant, form a five point restraint for the occupant.

The ends 72 of support bar 60 are attached to mounting brackets 74 of latches 76 used to latch seat back panel 22 to the structure 78 of the vehicle rear shelf 16. The loads applied to the belts 46 and 48 are transferred either to the vehicle floor pan 14 or through support bar 60 to the self structure 78.

Construction of the seat back panel 22 is shown in FIG. 3. The seat back panel 22 is comprised of a one piece blow molded plastic body 80 that is rotatably mounted to the vehicle body at pivot 82. The panel 22 is rotatable to a stowed position shown in phantom resting upon the seat cushion 18. The blow molded body 80 is sufficient for carrying the normal use loads of the panel 22, i.e. the load applied by seat occupants. Preferably, the restraint loads from the shoulder belts 46 and 48 are not carried by the plastic body 80. Restraint loads are therefore transferred from the belts through the support bar to the vehicle body structure.

The child seat pan 28 includes at its upper or forward end 83 a pair of U-shaped strikers 84 and 85 that are received by a pair of child seat latch levers; left latch lever 86 and right latch lever 87. The strikers 84 and 85 and the latch levers 86 and 87 are used to latch the child seat cushion 27 in the upright stowed position in the seat back panel. The latch levers 86 and 87 are pivotally mounted to the inboard ends of elongated brackets 88 and 89. The brackets 88 and 89 are mounted to the support bar 60 by members 90 and to the latch mounting brackets 74. The latch levers 86 and 87 are rotatable about the pivots 92.

In FIG. 4 the latch lever 87 is shown in a latched position with respect to the striker 85 of the child seat pan 28. An over-center tension spring 94 is coupled to the latch lever and to the bracket 89 to hold the latch lever 87 in the latched position. The child seat is deployed by pulling forward and downward on the child cushion 27 causing the latch lever 87 to rotate in the direction of the arrow 96, in opposition to the spring 94. In order for the latching lever to rotate to an unlatched position shown in FIG. 4A, the spring 94 will pass over the pivot 92 and now hold the latch lever in the unlatched position, awaiting return of the seat cushion 27. The springs 94, one for each latch lever 86 and 87, and the friction between the child seat cushion 27 and adjacent adult seat cushions is sufficient to hold the child seat cushion 27 in the upright stowed position. During a vehicle collision, the only force acting on the cushion 27 to unlatch it is its own inertia.

The latches 76 for attaching the seat back panel 22 to the vehicle structure are shown in greater detail in FIGS. 4 and 5. The vehicle structure includes a U-shaped striker 100 while the latches each include a seat back latch lever 102. The latch levers each have a slot for reception of the strikers 100 at each side of the seat back. Each latch lever 102 is pivotally mounted to the mounting bracket 74 by a flange 104 and a pivot 106. A spring loaded detent mechanism holds the latch lever 102 in the latched position shown in FIG. 4. The detent is released by pulling on the fabric tab 24 attached to the detent mechanism. When the detent is released, the latch lever is rotated in a counterclockwise direction, as shown by arrow 110, by the spring 108 releasing striker 100 from latch lever 102. A stop pin 112 rides along a recessed surface portion of the latch lever 102 to act as a stop to the rotational travel of the latch lever 102.

Since the restraint loads of the belts 46 and 48 are carried by the support bar 60 through the latches 76 to the vehicle structure, it is necessary that the latches 76 be in a latched position before the child seat assembly is used. To ensure that the latches 76 are properly latched, an interlock is provided between the seat back panel latches 76 and the child seat cushion latches. The interlock includes a pair of lock bars 114 that extend between the seat back panel latch levers 102 and the child seat pan latch levers 86 and 87, one bar on each side of the seat back.

With reference to FIG. 4, the lock bar 114 is pivotally attached at the end 116 to the seat back panel latch lever 102 by a pivot 118. The opposite end of the lock bar 114 is supported by a guide 119. When the latching lever is rotated counterclockwise as shown by the arrow 110, the lock bar 114 will be moved laterally in the direction of the arrow 120 toward the center of the seat back, i.e. toward the seat cushion latch lever 87. The child seat cushion latch lever 87 includes a slot 120 that is aligned with the lock bar 114 when the child seat cushion is in the stowed position as shown in FIG. 4. The end 122 of the lock bar 114 is positioned adjacent to the latch lever 87 such that when the lock bar 114 is moved toward the latch lever 87, the end 122 will pass into the slot 120 of the latch lever 87 shown by the phantom line. Due to the interference created by the lock bar 114 being inserted into the slot 120 of the latch lever 87, rotation of the latch lever 87 is prevented. This prevents deployment of the child seat cushion 27. As a result, when the seat back panel is unlatched, the child seat cushion 27 can not be unlatched. Only after the seat back panel 22 has been returned to its upright position and the latch lever 102 has returned to its latch position is the child seat latch lever 87 free to rotate.

The child seat latch lever 87 includes a curved edge surface 124 concentric about the pivot 92. When the child seat latching lever 87 has been rotated to the release position, as shown in FIG. 4A, the arcuate edge surface 124 abuts the end 122 of the lock bar 114. This will prevent movement of the lock bar toward the center of the seat back, thus preventing rotation of the seat back latch lever 102 from the latched position to the unlatched position. Thus, when the child seat cushion is deployed, the seat back panel can not be unlatched and folded down. Conversely, with the seat back panel unlatched, the child seat cushion can not be unlatched. This ensures that the seat back panel is latched before the child seat assembly can be used, providing a path for transferring the child seat assembly restraint loads to the vehicle structure.

The latch levers 102 are generally U-shaped with a pair of legs 124 and 126 extending from a closed end portion 128. The opposite end is open to form the slot 130 for reception of the strikers 100. In the latched position as shown in FIG. 4, the open ends of the latch levers 102 are directed inwardly. As a result, any bending deflection in the support bar 60 caused by the belts 46 and 48 during a vehicle collision will tend to move the mounting brackets 74 and the latch levers 102 toward each other. This results in deeper seating of the strikers 100 into the base of the slots 130 of the latching levers.

While the seat assembly has been shown in a vehicle with a rear shelf structure behind the seat back, the seat assembly can be used in other vehicle configurations as well. For example, the strikers 100 could be mounted to the vehicle side body. The shelf structure extending across the vehicle would not be necessary for latching of the seat back panel to the vehicle structure. It is thus apparent that the seat assembly 8 can be installed in vans, multi-purpose passenger vehicles, etc., not having a rear shelf structure.

It is to be understood that the invention is not limited to the exact construction illustrated and described above, but that various changes and modifications may be made without departing from the spirit and scope of the invention as defined in the following claims.

I claim:

1. In a seat assembly for use in a motor vehicle, the motor vehicle having a floor pan and a body structure, a seat back comprising:

a back panel with upper and lower ends, said panel having a first upwardly extending use position in said vehicle in which a portion of the upper end of said back panel is positioned adjacent to the vehicle body structure;

means for mounting said back panel to the vehicle floor pan for rotation about an axis transverse of the vehicle adjacent the lower end of said panel whereby said back panel can be forwardly rotated about said axis from said first use position to a second forwardly extending stowed position t gain access to the space behind said back panel;

first releasable latch means at the upper end of said panel for attaching said back panel to the body structure when said back panel is in said use position;

a child seat cushion having upper and lower ends mounted for rotation about said child seat cushion lower end, said child seat cushion having an upright stowed position generally within said back panel and a forwardly extending use position for use as a seat cushion for a child seat occupant;

second releasable latch means at the upper end of said child seat cushion for holding said cushion in said upright stowed position; and interlock means between said first and second latch means for preventing release of said second latch means when said first latch means is unlatched and for preventing release of said first latch means when said second latch means is released.

2. The seat back of claim 1 wherein said first latch means includes a first latch lever and a first striker and said second latch means includes a second latch lever and a second striker, said first and second latch levers being rotatable between latch and release positions to capture and release said first and second strikers respectively; and lock means responsive to the position of said first latch lever to permit rotation of said second latch lever only when said first latch lever is in said latch position, said lock means further being responsive to the position of said second latch lever to permit rotation of said first latch lever only when said second latch lever is in said latch position.

3. The seat back of claim 2 wherein said lock means comprises:

a lock bar having a first end pivotally mounted to said first latch lever and a second end mounted to said back panel and guided for substantially longitudinal motion upon rotation of said first latch lever;

said second latch lever having an edge surface abutting said second end of said lock bar when said second latch lever is rotated from said latch position whereby longitudinal movement of said lock bar and rotation of said first latch lever is prevented, said edge surface including a recess that is aligned with said lock bar second end when said second latch lever is in said latch position to permit longitudinal motion of said lock bar and insertion of said lock bar second end into said recess upon rotation of said first latch lever when said second latch lever is in said latch position, said lock bar, when inserted into said recess in said second latch lever preventing rotation of said second latch lever from said latch position.

4. The seat back of claim 3 wherein said first latch means includes left and right first latch levers at left and right upper corners of said back panel and left and right first strikers mounted to said vehicle structure for attaching said back panel to said body structure and said second latch means includes left and right second latch levers mounted to said seat back panel for reception of left and right second strikers at left and right upper corners of said child seat cushion; and said lock means including a left lock bar between said left first and second latch levers and a right lock bar between said right first and second latch levers.

5. The seat back of claim 4 further comprising:
left and right mounting brackets for mounting said left and right first latch levers to said back panel;
a support bar extending across said back panel and coupled to said left and right mounting brackets; and
means for restraining a child occupant seated upon said child seat cushion including at least one belt passing over and behind said support bar whereby loads applied to said at least one belt are at least partially transferred to said support bar and through said mounting brackets to said left and right first latch levers.

6. The seat back of claim 5 wherein said restraining means comprises:
left and right belts, each belt having first ends secured to the vehicle floor pan at left and right sides of said seat cushion;
left and right seat belt retractors mounted to the vehicle floor pan;
said left and right belts extending from said first ends over and behind said support bar and terminating in end portions attached to said left and right retractors respectively;
a pair of clasps, one slidably mounted on each of said belts; and
a buckle on the top of said child seat cushion when said cushion is in said use position, said buckle being disposed between the legs of a child seat occupant for reception of said clasps therein forming a five point restraint for a child seat occupant.

7. The seat back of claim 6 wherein said left and right retractors are automatic locking retractors.

8. The seat back of claim 1 further comprising a pivot bracket secured to the vehicle floor pan, said pivot bracket having mounting bosses for pivotally mounting said child seat cushion thereto and said pivot bracket being mounted to said vehicle floor pan by seat belt anchor bolts used to install seat belts in the motor vehicle for adult occupants of said seat assembly.

9. The seat back of claim 6 further comprising a pivot bracket for attachment to the vehicle floor pan, said pivot bracket having mounting bosses for pivotally mounting said child seat cushion thereto and for attaching said seat belt retractors to said vehicle floor pan, said pivot bracket being mounted to said vehicle floor pan by seat belt anchor bolts used to install seat belts for adult occupants of said seat assembly and seat belts for said child seat assembly.

10. The seat back of claim 4 wherein said left and right first latch levers are generally U-shaped each having two legs joined together at one end and open at the other end forming a slot between said legs for reception of said first strikers therein, said first latch levers, when in said latch positions, being oriented with said slots extending lateral with said open ends directed inwardly.

11. In a seat assembly for use in a motor vehicle, said motor vehicle having a floor pan and a body structure, a seat back comprising:
a back panel having lower and upper ends;
means for mounting said back panel to the vehicle floor pan for rotation about an axis transverse of the vehicle adjacent the lower end of said panel, said panel having a first upwardly extending use position in said vehicle in which a portion of said back panel above said axis is positioned adjacent said vehicle structure, said back panel being rotatable forwardly from said first use position to a second stowed position in which said back panel extends generally forwardly from said axis;
a pair of first latch levers rotatably carried by said seat back panel between latch and release positions and a pair of first strikers attached to said vehicle structure for capture by said first latch levers in said latch positions when said seat back panel is in said first position to hold said back panel in said first position, said first latch levers rotatable to said release positions to release said first strikers to allow forward rotation of said seat back panel;
a child seat cushion having upper and lower ends and mounted for rotation about said lower end thereof, said child seat cushion having an upright stowed position generally within said back panel and being rotatable to a forwardly extending use position for use as a seat cushion for a child seat occupant, said child seat cushion having a pair of strikers;
a pair of second latch levers carried by said seat back panel for rotation between latch and release positions for capture of said child seat cushion strikers when said child seat cushion is in said upright stowed position to hold said child seat cushion in said upright stowed position, said second latch levers being rotatable to release positions to release said second strikers to allow forward rotation of said child seat cushion; and
interlock means between said pairs of first and second latch levers for preventing rotation of said second latch levers to said release positions when said first latch levers have been rotated from said latch positions and for preventing rotation of said first latch levers to said release positions when said second latch levers have been rotated from said latch positions.

12. The seat back of claim 11 wherein said interlock means comprises:
a pair of lock bars, each lock bar having a first end pivotally mounted to one of said first latch levers and a second end mounted to said back panel and guided for substantially longitudinal motion upon rotation of said one of said first latch levers; and
said second latch levers each having an edge surface abutting said second end of one of said lock bars when said second latch levers are rotated from said latch positions whereby longitudinal movement of said lock bars and rotation of said first latch levers is prevented, said edge surface including a recess that is aligned with said lock bars' second ends when said second latch levers are in said latch positions to permit longitudinal motion of said lock bars and insertion of said lock bars' second ends into said recesses upon rotation of said first latch levers when said second latch levers are in said latch positions, said lock bars, when inserted into said recesses in said second latch levers preventing rotation of said second latch levers from s id latch positions.

13. The seat back of claim 12 further comprising:
left and right mounting brackets for mounting said pair of first latch levers to said back panel;
a support bar extending laterally across said back panel and being coupled to said left and right mounting brackets; and
means for restraining a child occupant seated upon said child seat cushion including at least one belt passing over and behind said support bar whereby loads applied to said at least one belt are at least partially transferred to said support bar and through said mounting brackets to said first latch levers.

14. The seat back of claim 13 wherein said seat back panel is a hollow blow molded body with said left and right mounting brackets attached thereto with said support bar extending laterally across said body to transfer restraint loads from said at least one belt to said mounting brackets and from there to said vehicle structure.

15. The seat back of claim 11 further comprising over-center springs coupled to each of said first latch levers operable to hold said latch levers in either the latch or release positions.

16. A seat assembly for use in a motor vehicle comprising:
a generally horizontal adult seat cushion having front and rear ends;
an adult seat back including a back panel with upper and lower ends, said back panel being movable between a first use position in which said back panel extends generally upward from the rear end of said seat cushion and a first stowed position, said adult seat cushion and said adult seat back providing seating surfaces for an adult seat occupant;
first releasable latch means for retaining said back panel in said first use position, said first releasable latch means being selectively releasable for permitting movement of said back panel from said first use position;
a child seat assembly providing seating surfaces for a child seat occupant including one member mounted to said seat back panel for movement between a second stowed position and a second use position, said child seat member enabling use of said seat assembly by an adult seat occupant when said child seat member is in said second stowed position and said child seat member enabling use of said child seat assembly ay a child seat occupant when said child seat member is in said second use position; and
interlock means between said first releasable latch means and said child seat member for preventing release of said first latch means when said child seat member has been moved from said second stowed position to said use position whereby said seat back panel can not be moved from said first use position when said child seat member has been moved from said second stowed position.

17. The seat assembly of claim 16 wherein said interlock means is further operable for preventing movement of said child seat member from said second stowed position when said first releasable latch means has been released.

18. The seat assembly of claim 17 further comprising second releasable latch means for retaining said child seat member in said second stowed position and said interlock means being operably coupled to both said first and second latch means.

19. The seat assembly of claim 16 wherein said seat back panel is mounted for rotation about a first axis extending laterally of said seat assembly at the lower end of said seat back panel and said seat back panel is rotatable from said first use position to said first stowed position resting upon said adult seat cushion; and
said child seat member comprises a child seat cushion having a lower end and being mounted to said seat back panel for rotation, about a second axis extending laterally of said seat assembly at the lower ends of both said child seat cushion and said seat back panel, between said second stowed position within said seat back panel and said second use position resting upon said adult seat cushion.

20. The seat assembly of claim 19 further comprising:
second releasable latch means for selectively retaining said child seat cushion in said second stowed position and said interlock means being operably coupled to both said first and second latch means.

21. The seat assembly of claim 20 wherein said seat back panel has first and second laterally spaced sides and said child seat cushion has first and second laterally spaced sides and wherein said first and second latch means each include first and second latch mechanisms with the first and second latch mechanisms of said first latch means being disposed at said first and second sides of said seat back panel respectively and said first and second latch mechanisms of said second latch means being disposed at said first and second sides of said child seat cushion respectively; and
said interlock means coupling said first latch mechanisms to one another and coupling said second latch mechanisms to one another.

22. The seat assembly of claim 16 wherein said first releasable latch means includes a rotatable first latch lever mounted to said seat back panel and a stationary latch member engagable with said first latch lever, said first latch lever having a latch position in which said first latch lever is engaged with said latch member when said seat back panel is in said first use position to retain said back panel in said first use position and said first latch lever being rotatable from said latch position to a release position disengaged from said latch member to permit rotation of said back panel from said first use position; and
said interlock means including means responsive to the position of said child seat member for preventing rotation of said first latch lever from said latch position when said child seat member is not in said second stowed position.

23. The seat assembly of claim 22 further comprising second releasable latch means for retaining said child seat member in said second stowed position, said second releasable latch means including a rotatable second latch lever having a latch position in which said child seat member is retained in said second stowed position, said second latch lever having a peripheral edge portion that is generally circular about a rotation center of said second latch lever;
said interlock means including a lock bar having a first end pivotally mounted to said first latch lever and a second end mounted to said back panel and guided for substantially longitudinal motion upon rotation of said first latch lever, said peripheral edge portion of said second latch lever abutting said second end of said lock bar when said second latch lever is rotated from said latch position whereby longitudinal movement of said lock bar and rotation of said first latch lever is prevented, and said peripheral edge portion including a recess that is aligned with said lock bar second end when said second latch lever is in said latch position to permit longitudinal motion of said lock bar and insertion of said lock bar second end into said recess upon rotation of said first latch lever when said second latch lever is in said latch position, said lock bar, when inserted into said recess in said second latch lever preventing rotation of said second latch lever from said latch position.

* * * * *

UNITED STATES PATENT AND TRADEMARK OFFICE
CERTIFICATE OF CORRECTION

PATENT NO. : 5,280,995
DATED : January 25, 1994
INVENTOR(S) : Robert D. Elton

It is certified that error appears in the above-indentified patent and that said Letters Patent is hereby corrected as shown below:

In the title, after "SEAT", delete "PACK" and insert in place thereof --BACK--.

In Column 6, line 11, Claim 1, after "position", delete "t" and insert --to--.

In Column 9, line 1, Claim 12, delete "sid" and insert in place thereof --said--.

In Column 9, line 50, Claim 16, delete "ay" and insert in place thereof --by--.

Signed and Sealed this

Twenty-sixth Day of July, 1994

Attest:

BRUCE LEHMAN

*Attesting Officer*     *Commissioner of Patents and Trademarks*